United States Patent
Gehrmann

(10) Patent No.: US 7,457,956 B2
(45) Date of Patent: Nov. 25, 2008

(54) SECURING ARBITRARY COMMUNICATION SERVICES

(75) Inventor: Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 715 days.

(21) Appl. No.: 10/344,352

(22) PCT Filed: Jul. 5, 2001

(86) PCT No.: PCT/SE01/01580

§ 371 (c)(1),
(2), (4) Date: Aug. 4, 2003

(87) PCT Pub. No.: WO02/15466

PCT Pub. Date: Feb. 21, 2002

(65) Prior Publication Data

US 2004/0103316 A1    May 27, 2004

(30) Foreign Application Priority Data

Aug. 11, 2000    (SE) .................................... 0002962

(51) Int. Cl.
*H04L 29/00*    (2006.01)
(52) U.S. Cl. ...................... 713/171; 713/155; 713/156; 713/168; 713/175; 713/176; 726/2; 726/3; 726/4; 726/5; 726/12; 726/14
(58) Field of Classification Search .................. 726/2–8, 726/12, 14; 713/155, 156, 168, 175, 176, 713/171
See application file for complete search history.

(56) References Cited

U.S. PATENT DOCUMENTS 5,586,260 A    12/1996    Hu (Continued)

FOREIGN PATENT DOCUMENTS

EP    0942568    9/1999

(Continued)

OTHER PUBLICATIONS

Jaeger et al., "Flexible Control of Download Executable Content", May 1999, ACM Transaction on Information and System Security, vol. 2, No. 2, pp. 177-228.*

(Continued)

*Primary Examiner*—Kambiz Zand
*Assistant Examiner*—Tongoc Tran
(74) *Attorney, Agent, or Firm*—Roger S. Burleigh

(57) ABSTRACT

The present invention relates to securing information in open systems and more particularly to a method and a system for providing authentication, confidentiality and integrity protection of arbitrary communication services. A client that wishes to communicate with a particular service downloads a signed program code from that service containing code necessary for doing authenticated key exchange with that service. The client is assumed to support only two basic cryptographic functions: signing of arbitrary data by using a public key algorithm together with a one way hash function, and verifying a public key signature of arbitrary data. By allowing the security protocol needed for key exchange and data communication protection to be downloaded the number of predefined security functions that a client or server needs to support is limited. This also makes it much easier to update the communication protection since only the server program needs to be updated.

10 Claims, 3 Drawing Sheets

U.S. PATENT DOCUMENTS

| | | | |
|---|---|---|---|
| 5,778,174 | A | 7/1998 | Cain |
| 5,781,550 | A | 7/1998 | Templin et al. |
| 5,892,904 | A * | 4/1999 | Atkinson et al. ............. 726/22 |
| 6,055,236 | A | 4/2000 | Nessett et al. |
| 6,694,431 | B1 * | 2/2004 | Binding et al. ............. 713/160 |
| 6,901,518 | B1 * | 5/2005 | Scheifler et al. ............. 726/12 |
| 7,089,211 | B1 * | 8/2006 | Trostle et al. ................ 705/51 |
| 2001/0045451 | A1 * | 11/2001 | Tan et al. .................... 235/375 |

FOREIGN PATENT DOCUMENTS

| WO | WO 9933224 | 7/1999 |
|---|---|---|
| WO | WO 9953391 | 10/1999 |
| WO | WO 9956428 | 11/1999 |
| WO | WO 9964967 | 12/1999 |

OTHER PUBLICATIONS

Barak et al., "The Proactive Security Toolkit and Applications", 1999, Proceedings of the 6th ACM Conference on Computer and Communication Security, pp. 18-27.*

Schecter, R., "Security and Authentication with Digital Signatures", 1997; Linux Journal, vol. 1997, Article No. 6.*

* cited by examiner

SECURING ARBITRARY COMMUNICATION SERVICES

FIELD OF INVENTION

The present invention relates in general to securing information in open communication systems, and more particularly to a method and a system for providing authentication, confidentiality and integrity protection of arbitrary communication services.

DESCRIPTION OF RELATED ART

In open communication systems there is a need of securing the information. This includes authentication of the communication peers and confidentiality and integrity protection of the data. Authentication implies that some means has been provided to guarantee that the entities are who they claim to be, or that the information transmitted has not been manipulated by unauthorized parties. Confidentiality basically implies that no unauthorized entity is able to read our message and data integrity ensures that our message has not been altered and that the whole message stream comes from the same source and that the whole message stream goes to the same destination.

Solutions to these types of problems come from cryptographic research. Typically a cryptographic algorithm is a function that has one value that should be kept secret or should be protected as input and another secret value as input. The secret value is often called a secret key of the algorithm. Many modern secure communication systems uses well known cryptographic algorithms and the security is not based on the algorithm itself but on a secret key. The assumption that only the actual key is kept secret from the adversary is called Kerkhoff's assumption. The Kerkhoff's assumption is important in open communication systems like the Internet, where devices from many different vendors at many different locations needs to inter-operate. It is much easier to make the communication work if the methods of how to process the data is publicly known. Hence, all Internet communication security techniques are built on Kerkhoff's assumption i.e. well known cryptographic algorithms with the security based on secret key values.

In order to set up a secure communication channel there must be some predefined protocol that describes which messages that should be exchanged between the communication peers. A necessary step in securing a communication system is to provide authenticated key exchange. Typically a key exchange is done by using a public key algorithm, e.g. the Diffie-Hellman (DH) algorithm, used in e.g. the Internet Key Exchange Protocol (IKE), the Transport Layer Security protocol (TLS) and the Secure Shell Protocol (SSH), or the Rivest-Shamir-Adleman (RSA)-algorithm, used in e.g. TLS.

In open security protocols like SSH, TLS and Internet Protocol Security (IPsec)/IKE, public key algorithms are used to digitally sign data or to do key exchange. Several different public key signature methods as well as key exchange methods might be used. The basic protocol that is used to encrypt payload data and to add an integrity check tag is very similar in the protocols. However, the authentication procedure, the key exchange and the different symmetric algorithms supported in the protocols differ substantially. Hence, a problem is that at least one of the communication peers must support a very large number of different cryptographic algorithms and security options if two units without a predefined secure relation should be able to inter-operate securely. Furthermore, the large number of different options make the key negotiation protocols very large and complex, and simply hard to implement.

In U.S. Pat. No. 5,892,904 is described a method that ensures authenticity and integrity of a computer program, an executable file, or code received over a computer network, e.g. the Internet. In one embodiment the method involves determining a cryptographic digest or "hash" of the executable file and forming a publisher signature with the cryptographic digest. The publisher signature is formed with a public-private key signature algorithm such as the RSA (Rivest-Shamir-Adleman) public key algorithm, as is well known in the art. A publisher digital certificate is attached to the publisher signature to authenticate the identity of the publisher issuing the publisher signature. The digital certificate includes the software publisher's name, a public key corresponding to a private key used by the publisher to sign the file, an expiration date of the certificate, and a link or hyperlink to the certification agency.

WO 99/56428 describes another secure method of downloading a program into a processor from a device external to the processor. The program may be encrypted and have authentication information added to it. The processor decrypts and authenticates the program before allowing the program to be executed by the processor.

WO 99/33224 discloses a method and system ensuring that a data stream including e.g. video- or audio data only can be received by authorised receivers. The receivers can also prove the number of received video- or audio data packets. This is done by encrypting every data packet sent in the data stream and logging the number of decrypted packets in the receiver.

None of these documents describe how a secure communication channel is established between two communication peers not having a predefined security relation. This is a common situation in e.g. ad hoc networks, i.e. Bluetooth™, Salutation™, Jini™ etc. Thus, there is a need for a method and system showing how to establish secure communication between a client and an arbitrary communication service.

SUMMARY OF THE INVENTION

The present invention provides a solution to the problem of securing a communication channel between two communication peers not having a predefined secure relation.

In state-of-the art protocols at least one of the communication peers must support a very large number of different cryptographic algorithms and security options if two units should be able to inter-operate, making the key negotiation protocols large and complex.

One object of the invention is thus to provide a solution where the number of needed predefined cryptographic algorithms are as few as possible.

Another object of the invention is to reduce the complexity of the key negotiation protocols depending on the number of supported options and cryptographic algorithms.

Yet another object is to provide a solution where the problem of export restrictions is reduced.

The above mentioned objects are basically achieved by downloading from a particular service, that a communication client wants to communicate with, a signed computer program (e.g. a Jini™ Proxy) containing the necessary algorithms for doing authenticated key exchange with the server. Furthermore, the computer program contains the necessary algorithms needed to encrypt and protect all data sent between the client and the service in a secure service session.

More specifically the invention concerns a security communication situation where a communication client wants to communicate with a particular service. The service can be reached by the client using either a global network such as the Internet, a local network or even an ad hoc network, i.e. a network created on the fly between entities that happen to be at the same physical location. It is also assumed that all units that utilises the service use a common computing platform, i.e. all units can download and execute a program written in a common language. An example of a widely deployed such computing platform and language is the Java™ virtual machine and the Java™ byte code computing language. The client is supposed to have only two pre-defined cryptographic capabilities; the ability to digitally sign arbitrary data and the ability to verify a digital signature of arbitrary data.

The server that wants to offer a secure communication service digitally signs a computer program containing the necessary algorithms for authenticated key exchange with the server using its private key in a public key pair. The server packs the signed code together with the signature and optionally also one or several certificates that certify the public key of the server. The server's public key can then be used to verify code signed by the server.

A client that wants to communicate with a service downloads over the network the package with the signed code and a possible certificate and checks the signature of the downloaded package. If the client holds a trusted public key that corresponds to the signature or the client trusts some of the public keys contained in the certificates included then the client treats the downloaded code as a trusted security code.

The security code is then executed on the common computing platform of the client and can ask the client to perform one security function if mutual authentication is desired. This function has as input some arbitrary data and as output a digital signature of the data plus a specific label added by the client. The client might also return a certificate containing the public key that can be used by the service to verify signatures made by the client. The service code performs authenticated key exchange with its origin server. If it succeeds it sets up a secure communication link with the server.

In a first embodiment of the invention the authenticated key exchange is made more efficient by taking advantage of that the key exchange code itself is signed and thereby saving one public key signature generation, one public key signature verification and one transmission between client and the server.

In a second embodiment of the invention the key exchange is separated from the protection of the communication. The benefit with that approach is that several different services can be protected using one master key, instead of that each service must perform a heavy public key exchange.

By allowing the security protocol code needed for key exchange and data communication protection to be downloaded the number of needed predefined security functions that a client or server need to support is limited. Instead the security is guaranteed by signing the security code itself. This also makes it much easier to update the communication protection with new algorithms, since when there appears to be security flaws in the protocol and the whole or parts of the protocol must be rewritten it is only the server program that needs to be updated.

Since the necessary cryptographic functions needed by the client are only signing and verification of signatures there is usually no problem with export regulations, since these functions are normally not restricted.

BRIEF DESCRIPTION OF THE DRAWINGS

These and other objects and advantages of the invention will become more fully apparent from the following detailed description when read in conjunction with the accompanying drawings with like reference numerals indicating corresponding parts, and wherein.

DETAILED DESCRIPTION

Figure 1:
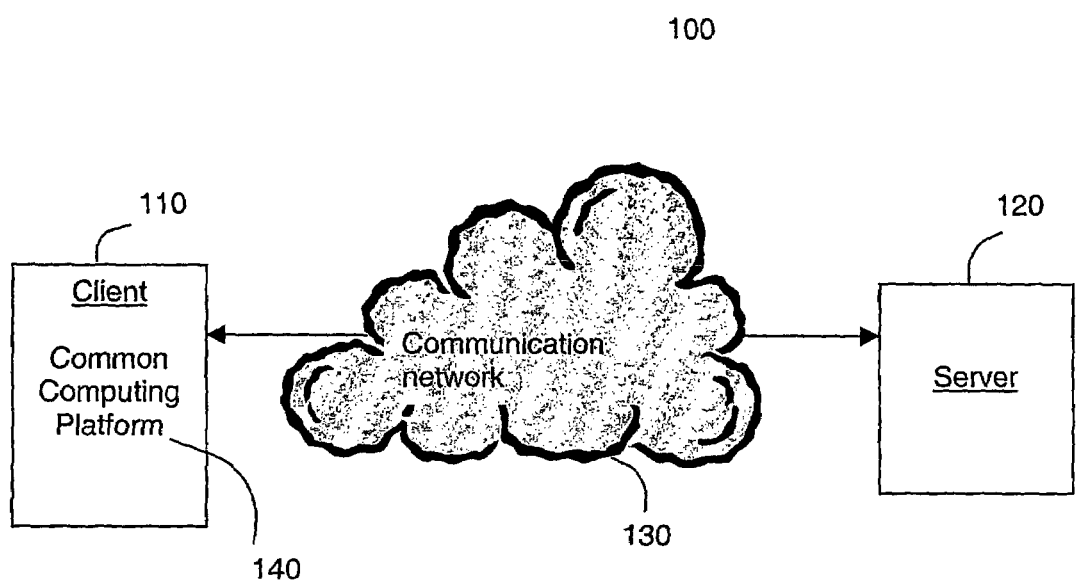
FIG. 1 shows the basic communication scenario.

Referring now to FIG. 1, the present invention will be described in a security communication situation 100 where a communication client 110 wants to communicate with a server 120 providing particular services. The server 120 can be reached by the client 110 using a global network, e.g. the Internet, or a local communication network or even an ad hoc network 130. Furthermore, it is assumed that all units that utilises the services use a common computing platform 140, i.e. all units can download and execute a computing program written in a common language. An example of a widely deployed such computing platform and language is the Java™ virtual machine and the Java™ byte code computing language. The unit offering the service, i.e. the server 120, has full knowledge of the language and the common computing platform used by different clients 110 in the network.

The invention will now be described using the Java™ Jini™ technology as an example of a communication client wishing to connect to a communication service. The Java™ Jini™ technology makes computers and devices able to quickly form ad hoc networks without any planning, installation or human intervention. Each device provides services that other devices in the network may use. These devices also provide their own interfaces, which ensures reliability and compatibility. Each device and service is registered in a lookup service, and when new devices enter the network they go through an add-in protocol called discovery and join. To use a service a person or a program locates the service using the lookup service. The service's interface is copied from the lookup service to the requesting device where it will be used. The lookup service thus acts like a switchboard to connect a client looking for a service with that service. It doesn't matter where a service is implemented since compatibility is ensured because each service provides everything needed to interact with it in a downloadable Jini™ proxy.

In a wireless ad hoc network trust is one of the central problems. Since we cannot trust the medium, the only choice is to use cryptography. One of the main problems is that we cannot assume any pre-configured security relations between the ad hoc nodes. Given that all of the nodes in the ad hoc network have public key pairs, and that all of the nodes consider the public keys of others' good for creating secure connections within the ad hoc network any public key based authentication can be used.

Different from standard approaches it is in this invention not assumed that the client and server necessarily share a large set of different symmetric key encryption or Message Authentication Code (MAC) algorithms. Instead it is assumed that the client has only two predefined cryptographic capabilities:

The client can digitally sign arbitrary data by using a public key algorithm together with a one way hash function; and The client can verify the correctness of a public key signature of arbitrary data. The algorithms used to sign the data are chosen among a quite small amount of possible algorithms.

The software program or hardware used for signing or verifying a signature of arbitrary data is physically located in the client such that it can not be changed or manipulated by a hostile person. The software or hardware used for signing or verifying signatures does not completely need to use the common computing platform, e.g. can APIs (Application Program Interfaces) defined in the computing platform be used instead.

Figure 2:
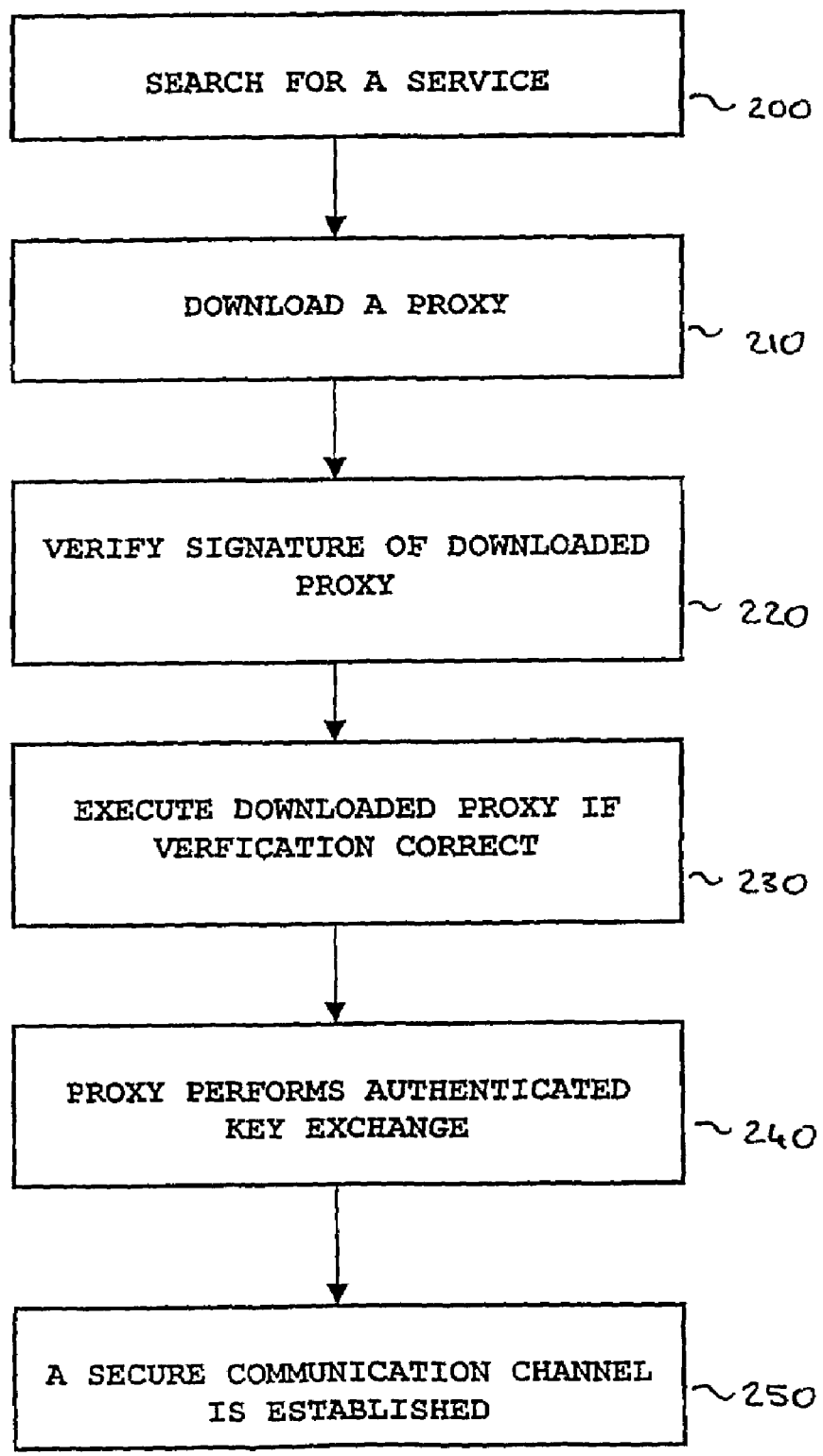
FIG. 2 shows a flowchart of an embodiment of the invention.

Using the cryptographic capabilities described above, a client can securely download a Jini™ proxy, and use the Jini™ proxy to execute an authentication and key management protocol on its behalf. This gives a total freedom to utilise service dependent security solutions. Now a first embodiment of the invention will be described referring to the flowchart of FIG. 2.

Before any communications are started, the server prepares a Jini™ proxy that the clients can download. The server also signs the Jini™ proxy; thereby allowing the clients to verify the integrity and origin of the Jini™ proxy before the Jini™ proxy is executed. The Jini™ proxy code typically includes a public key corresponding to a private key held by the server and methods needed for doing authenticated key exchange with the server.

1. A server that wants to offer secure communication holds a computer program written in the computer language of the common platform, i.e. Java. In Jini™ terms, the server holds a Jini™ proxy. The Jini™ proxy contains the necessary algorithms and methods needed for doing authenticated key exchange with the server. Furthermore, the proxy contains the necessary algorithms needed to encrypt and protect all data sent between a client and a server in a secure service session. However, the proxy does not necessarily contain all code needed to perform cryptographic computation. Instead, the proxy might use APIs defined in the common platform, if feasible.

2. The server digitally signs the Jini™ proxy using its private key. The signature is calculated using the predefined algorithms and formats described above. This ensures that the client will be able to verify the signature.

3. The server packs the signed code together with the signature and optionally includes also one or more certificates that certify the public key of the server. The servers public key can be used to verify the authenticity of the server.

In Jini™, and similar environments, a client looking for a service starts the communication. Once the service is found, the client downloads the service proxy for execution, with the difference that the authenticity of the service proxy is verified before starting its execution.

4. A client search for a service using the Jini lookup service 200.

5. When the client finds the service and wants to use it, the client downloads a proxy corresponding to the service, together with signatures and optional certificates 210.

6. The client verifies the signature of the downloaded data package. If the client holds a trusted public key that corresponds to the signature, or the client trusts some of the public keys contained in the certificates included, then the client treats the downloaded code as a trusted code 220.

7. If the verification of the proxy is correct, the client executes the downloaded code using the common computing platform. Runtime restrictions might be added as appropriate; especially, the downloaded code does not need to be able to communicate with any other server but the designated 230.

The downloaded code can ask the client to create a signed ticket if mutual authentication is required. The client may refuse to perform any other cryptographic functions. The ticket creation function takes some arbitrary data and outputs a ticket, which basically is a digital signature of the data plus a specific label added by the client. The label is needed in order to make sure that the resulting item is always recognised as a ticket. The client might also return a certificate containing a public key that can be used to verify signatures made by the client. The ticket label typically designates the service the client has requested the proxy for, and a time stamp. Before the client machine digitally signs the data and the label, the label should be displayed to the user of the client machine. The user might at that time refuse to sign the ticket. Thus the Jini™ proxy and the server can authenticate each other as follows.

8. The proxy performs authenticated key exchange with its origin server 240. The actual protocol used can basically be any standard authentication and key exchange protocol, e.g. DH or RSA. The Jini™ proxy might request a certificate from the client certifying the public key for verifying the signature of ticket mentioned above. If the authentication succeeds, the proxy sets up a secure communication link with the server 250.

The service provider that writes the security code can implement the key exchange algorithm as it wishes, but should follow good cryptographic principles. The security level thus, depends on the algorithm used by the server.

In a first embodiment of the invention the fact that the key exchange code itself is signed by the server is used to save one public key signature generation and one public key signature verification and one transmission between the client and the server. This is possible since the signature of the key exchange code is checked prior to the real key exchange. Hence authenticated information about the server's public key is already available to the client. For example if Diffie-Heilman is used, the public key exchange value of the server can be contained in the service code. Hence the key exchange can be performed with one single transmission from the client to the server and we save one transmission.

Figure 3:
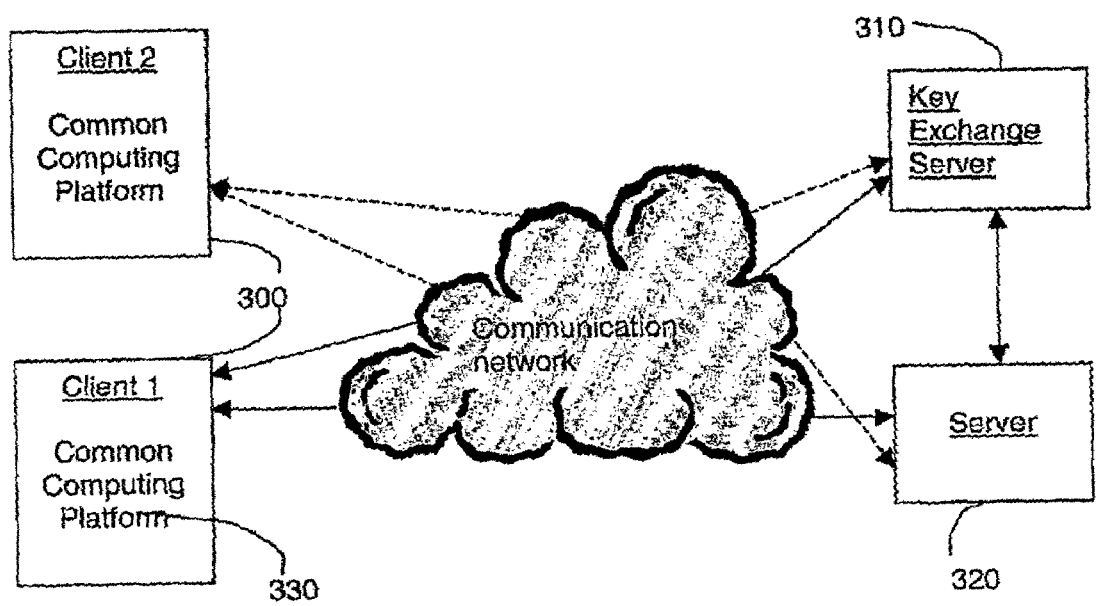
FIG. 3 illustrates an alternative communication scenario using a key exchange server.

In a second embodiment of the invention, illustrated in FIG. 3, the key exchange is separated from the pure communication protection. The benefit with this approach is that several different services can be protected using one group master key, instead of that each service must perform a heavy public key exchange. Thus, instead of searching for a service the client 300 searches for a key exchange server 310. The client 300 receives from the key exchange server 310 a group master key and an identifier for that key. Later when the client 300 wants to use a service in the same domain as the key exchange server was located, the client search for a server 320 providing a service, downloads a package from the server 320 and executes the package on the common computing platform 330. The downloaded security code can ask the client 300 to perform one security function, which has the group master key identifier as input and as output the group master key. When doing the key exchange the downloaded service code uses the group master key.

The invention has now been described using Jini™ technology as an example but the only requirement on the nodes is that they support a common computing platform, i.e. that all nodes in the ad hoc network can download and execute programs written in a common language and the ability to generate and verify signatures. The invention can e.g. also be used when setting up secure WAP (Wireless application protocol)-services, i.e. by downloading a program code defining the security algorithm.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for establishing secure communication between a client and a requested service at a service providing server, the client and the server having a common computing platform supporting digital signing and verification of arbitrary data, said method comprising the steps of:

downloading, in a first transmission, from the server to the client, a digitally signed data package containing algorithms/proxy, corresponding to the service, for doing authenticated key exchange that includes a certificate that certifies a public key of the server, wherein the client and the server do not have a predefined security relation;

verifying in the client the digital signature of the downloaded data package based on a trusted public key of the client that corresponds to the digital signature;

wherein said digital signature is verified by said client returning, in a second transmission, a client certificate including a public key of the client to the server; and, generating at the client and the server a shared security key, wherein said generating comprises execution at the client of said algorithms/proxy; and, using the shared key to encrypt communication between client and server.

2. The method of claim 1, further comprising the step of said downloaded data package asking the client to perform a security function for mutual authentication, said security function having as input some arbitrary data and as output a digital signature of said data and a label added by the client.

3. The method of claim 2, wherein said label is text identifying the requested service and a time stamp.

4. The method of claim 1, wherein said common computing platform is the Java virtual machine and the Java byte code computing language.

5. The method of claim 1, wherein said server is a key exchange server providing a group master key for protecting communication with several services.

6. A system for establishing for secure communication between a client and a requested service at a service providing server, the client and the server having a common computing platform supporting digital signing and verification of arbitrary data, said system comprising:

means for downloading, in a first transmission, from the server to the client, a digitally signed data package containing algorithms/proxy, corresponding to the service, for doing authenticated key exchange that includes a certificate that certifies a public key of the server, wherein the client and the server do not have a predefined security relation;

means for verifying in the client the digital signature of the downloaded data package based on a trusted public key of the client that corresponds to the digital signature;

wherein said digital signature is verified by said client by means for returning, in a second transmission, a client certificate including a public key of the client to the server; and, means for generating at the client and the server a shared security key, wherein said generating comprises execution at the client of said; and algorithms/proxy; and, means fo using the shared key to encrypt communication between client and server.

7. The system of claim 6, wherein said downloaded data package includes means for asking the client to perform a security function for mutual authentication, said security function having as input some arbitrary data and as output a digital signature of said data and a label added by the client.

8. The system of claim 7, wherein said label is text identifying the requested service and a time stamp.

9. The system of claim 6, wherein said common computing platform is the Java virtual machine and the Java byte code computing language.

10. The system of claim 6, wherein said server is a key exchange server having means to provide a group master key protecting communication with several services.

* * * * *

UNITED STATES PATENT AND TRADEMARK OFFICE
CERTIFICATE OF CORRECTION

PATENT NO. : 7,457,956 B2  Page 1 of 1
APPLICATION NO. : 10/344352
DATED : November 25, 2008
INVENTOR(S) : Gehrmann It is certified that error appears in the above-identified patent and that said Letters Patent is hereby corrected as shown below:

Column 5, Line 51, delete "Jini" and insert -- Jini™ --, therefor.

Column 6, Line 36, delete "Diffie-Heilman" and insert -- Diffie-Hellman --, therefor.

Column 8, Line 25, in Claim 6, delete "said; and" and insert -- said --, therefor.

Column 8, Line 26, in Claim 6, delete "fo" and insert -- for --, therefor.

Signed and Sealed this

Twenty-first Day of April, 2009

JOHN DOLL
*Acting Director of the United States Patent and Trademark Office*